Dec. 19, 1933.   H. C. HOWARD ET AL   1,939,852
METHOD OF LINING GLOVES
Filed Dec. 22, 1930
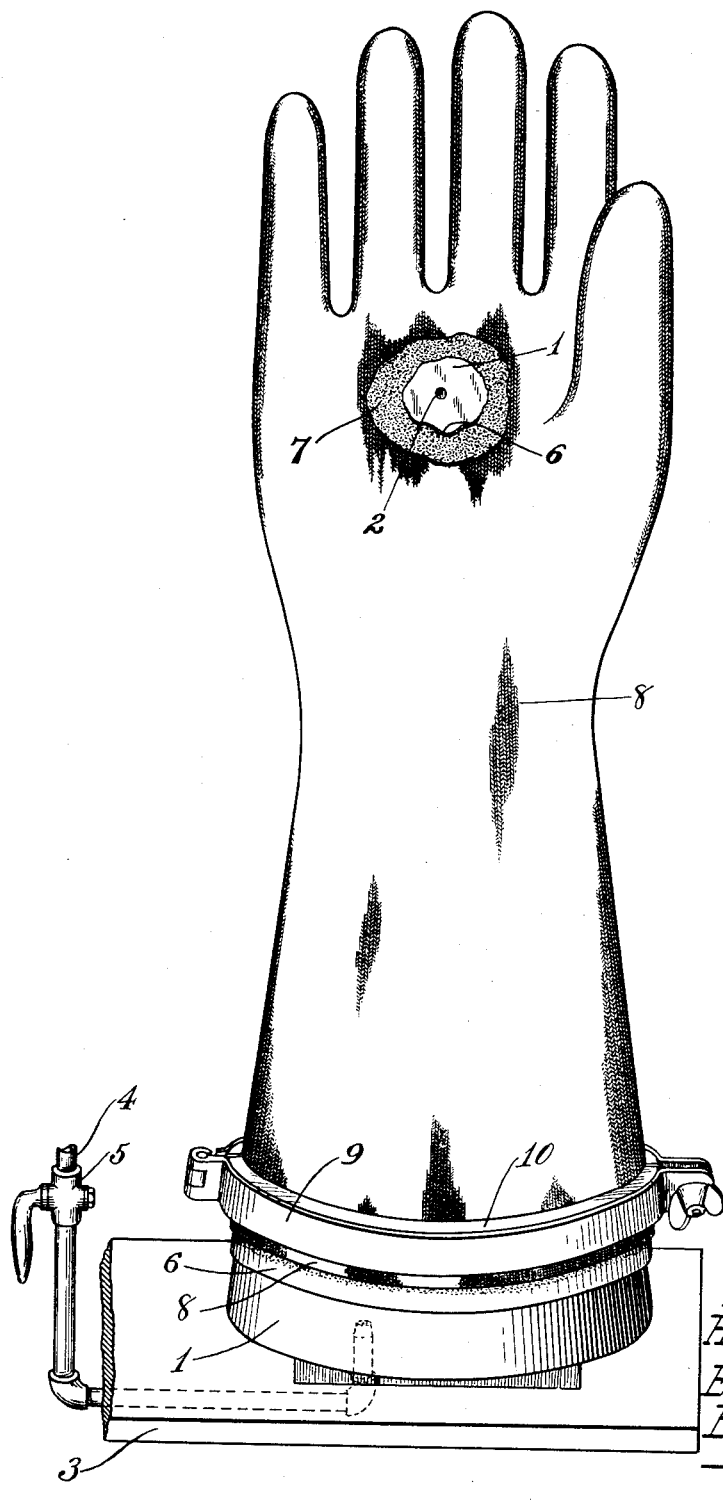

Patented Dec. 19, 1933

1,939,852

UNITED STATES PATENT OFFICE 1,939,852

METHOD OF LINING GLOVES

Henry C. Howard, Akron, and Edward A. Willson, Cuyahoga Falls, Ohio, assignors to The B. F. Goodrich Company, New York, N. Y., a corporation of New York Application December 22, 1930
Serial No. 503,902

8 Claims. (Cl. 154—2)

This invention relates to the manufacture of rubber, and particularly to the manufacture of certain types of seamless rubber articles such as rubber gloves.

Rubber gloves are very extensively employed in the industries as well as in the home for protecting the hands against water, corrosive solutions, the action of the electric current, or of the sand blast, etc. For many of these uses a fabric lined glove is preferred because of its superior strength and resistance to tearing, as well as for its greater warmth and more pleasant feel and because of the greater ease with which it may be put on and taken off. However, the products of previously known methods of manufacturing lined rubber gloves suffered from certain disadvantages which tended to prevent their widespread adoption. Among these disadvantages are included an excessive harshness or stiffness which makes it difficult to bend the fingers and consequently rapidly fatigues the hand of the wearer, and a rough or uneven surface which detracts from the appearance of the glove.

The objects of this invention consequently include the manufacture of lined rubber gloves possessing superior properties such as high strength, smooth surface, and maximum flexibility; and the provision of a new method for the manufacture of such gloves.

In the method of this invention the linings are preferably applied to seamless, vulcanized rubber gloves, and will be described with reference to such gloves, although it will be understood that built-up gloves or unvulcanized gloves, especially those produced directly from latex, may be treated in much the same manner. The seamless gloves may be manufactured in any conventional manner, say by repeated dipping of a form in a rubber cement and drying of the layers of liquid, or directly from an aqueous dispersion such as latex, by dipping either with or without the assistance of a coagulant, or by electrodeposition. The rubber is then vulcanized in any usual manner.

Thin gloves may be lined directly on the forms on which they are produced, being then turned inside out to bring the lining to the inside of the glove. It is preferred, however, especially in treating the heavier grades of gloves, to carry out the process on a special form and to apply the lining with the glove reversed so that it is again right side out when the glove is turned inside out after lining.

The invention will be described with reference to the accompanying drawing which shows a lined rubber glove in the course of manufacture.

The form 1 on which the lining is applied may be made of any convenient material such as metal, wood, porcelain, etc., but an ordinary porcelain glove form with a hole 2 drilled in the palm serves as well as any. The form is solidly mounted on a suitable base or table 3 and is connected to a compressed air pipe 4 through a valve 5.

The form is wetted by wiping it with a wet sponge or rag and the seamless, vulcanized rubber glove 6 is turned inside out and slipped over the form reversed, being carefully smoothed down into the crotches between the fingers of the form. The exposed surface of the glove (normally the inside) is then painted with a fairly thick layer 7 of a heavy rubber cement, so that an appreciable thickness of rubber will remain after the evaporation of the solvent. The lining 8 is then wetted thoroughly with gasoline and pulled on over the cemented glove, especial care being taken to pull it well down into the crotches between the fingers.

The lining is here shown as a seamless lining of a somewhat extensible fabric such as stockinet or jersey, knitted as nearly as may be to the exact shape and size of the glove. However, the invention is not limited to this particular form of lining since the lining may be made by sewing the fabric together in the proper shape, if the presence of the sewed seams is not objectionable, or may even be made of other types of fabric.

The lining is firmly bound against the cuff of the rubber glove on the form to prevent leakage of air, preferably by applying a split metal clamp 9 having a sponge rubber lining pad 10, although other means such as a tape of ordinary or rubberized fabric may be employed if desired. The valve 5 is then opened to admit compressed air at a pressure of about 5 to 10 pounds per square inch into the form 1 and thence through the hole 2 into the space between the form and the glove 6. The air inflates the glove 6 against the lining 8 and squeezes the cement into the meshes of the fabric lining to a sufficient extent to secure a good adhesion of the rubber to the fabric. The adhesion may be assisted somewhat by scrubbing or massaging the inflated lining 8 with stiff brushes wet with gasoline, in order to distribute the cement more uniformly between the glove and the lining. The lining is then permitted to dry in the inflated condition and the valve 5 is closed, the clamp 9 removed and the lined glove removed from the form by turning it back inside out over the fingers.

In order to avoid excessive swelling of the rubber glove by the solvent of the cement it is essential that the solvent be eliminated promptly from the cement and the lining. At the same time, it is desirable that a considerable pressure be applied between the rubber and the fabric lining while the cement is drying, in order that the maximum degree of adhesion may be attained. These considerations are admirably fulfilled in the preferred method described above, in which the lining itself is the restraining means against which the inner air pressure acts, and is consequently completely exposed to the atmosphere to permit a rapid evaporation of the solvent and a drying of the cement while the rubber and the fabric are in pressure contact one with the other.

A vulcanization of the layer 7 of cement is not ordinarily required since a good adhesion of the lining 8 to the glove is secured without vulcanization. However, where a completely vulcanized cement is preferred, the cement may contain vulcanizing ingredients including sulphur and an ultra-accelerator. Vulcanization is then accomplished in a few days at room temperature, or in a shorter time if the glove is heated. The vulcanizing cement is preferably made in two portions one of which contains rubber and sulphur, and the other rubber and accelerator, and mixed just before it is used.

In the lining of heavy rubber gloves it is sometimes advantageous, after the glove is pulled on the form, but before it is cemented, to connect the pipe 4 for an interval with a vacuum line, in order to suck the palm of the glove closely against the form. This added step makes cementing considerably easier and assists in the subsequent application and accurate placing of the fabric lining.

The finished lined glove has a smooth, regular outer surface, since it is made from a seamless glove, which itself has such a surface. Since the glove is made seamless and of a definite, controllable thickness before the lining is applied, it is free from thin spots such as may be formed when a lining is placed directly on a form and then dipped to build up a glove, and is likewise free from thick, heavy, lap seams such as are formed in building up gloves from rubberized sheeting. The lining is never immersed in a liquid rubber dispersion, hence the rubber does not penetrate the fabric lining to such an extent as to overcome the advantages of the lined glove, but only sufficiently to assure a permanent adhesion.

The product is a comfortable, warm, flexible, and durable glove with a very neat and attractive appearance.

It will be understood that the invention is not limited to the precise embodiment hereinabove described for purpose of illustration, but that numerous changes and modifications may be made within the scope of the appended claims without departing from the spirit of the invention.

We claim:

1. The method of lining gloves which comprises adhering a completely shaped unitary fabric lining to the external surface of a shaped rubber glove, inflating the glove temporarily against the lining to assist the adhesion, and reversing the lined glove.

2. The method of lining gloves which comprises cementing a completely shaped unitary fabric lining to the external surface of a shaped, vulcanized, rubber glove, inflating the glove against the lining while the cement is drying, and reversing the lined glove.

3. The method of lining gloves which comprises coating a shaped, vulcanized, rubber glove with a rubber cement, applying a completely shaped unitary fabric lining wet with a rubber solvent to the exposed, cemented surface of the glove, inflating the glove against the lining while the cement is drying, and reversing the lined glove.

4. The method of lining gloves which comprises reversing a shaped rubber glove, placing it upon a form with the inside surface exposed, coating the exposed surface of the glove with a rubber cement, applying a completely shaped unitary fabric lining to the exposed, cemented surface of the glove, inflating the glove against the lining while the cement is drying, removing the glove from the form, and reversing it.

5. The method of lining gloves which comprises placing a shaped rubber glove on a form of substantially the shape of the glove, sucking the glove into contact with the form, cementing a shaped fabric lining to the exposed surface of the glove, inflating the glove against the lining while the cement is drying, removing the glove from the form, and reversing it.

6. The method of lining gloves which comprises reversing a shaped, vulcanized, rubber glove, placing it on a form of substantially the shape of the glove with the inside surface exposed, sucking the glove into contact with the form, coating the exposed surface of the glove with a rubber cement, wetting a shaped fabric lining with a rubber solvent, applying the wet lining to the exposed, cemented surface of the glove, inflating the glove against the lining while the cement is drying, removing the lined glove from the form, and reversing it.

7. The method of lining gloves which comprises fabricating a unitary textile lining conforming to the shape of the glove and adapted to resist internal fluid pressure, cementing the lining to the surface of a seamless rubber glove, inflating the glove against the lining while the cement is drying, and reversing the glove.

8. The method of lining gloves which comprises fabricating a unitary textile lining conforming to the shape of the glove and adapted to resist internal fluid pressure, reversing a seamless vulcanized rubber glove and placing it inside out on a form, cementing the glove and slipping the lining over the cemented glove, inflating the glove against the lining while the cement is drying, and removing the glove from the form and reversing it again.

HENRY C. HOWARD.
EDWARD A. WILLSON.